United States Patent
Price et al.

(10) Patent No.: US 12,228,398 B2
(45) Date of Patent: Feb. 18, 2025

(54) NON-CONTACTING ANGULAR MOTION MEASURING DEVICE

(71) Applicant: The Aerospace Corporation, El Segundo, CA (US)

(72) Inventors: Kenneth D. Price, Long Beach, CA (US); Felix T. Sasso, Los Angeles, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 310 days.

(21) Appl. No.: 17/703,617

(22) Filed: Mar. 24, 2022

(65) Prior Publication Data

US 2023/0304786 A1 Sep. 28, 2023

(51) Int. Cl.
*G01B 7/30* (2006.01)
*G01D 5/14* (2006.01)

(52) U.S. Cl.
CPC ............. *G01B 7/30* (2013.01); *G01D 5/145* (2013.01)

(58) Field of Classification Search
CPC ... G01B 7/30; G01D 5/02; G01D 5/12; G01D 5/14; G01D 5/142; G01D 5/145; G01D 5/16; G01D 5/54
See application file for complete search history.

(56) References Cited

U.S. PATENT DOCUMENTS

| | | | | |
|---|---|---|---|---|
| 5,553,500 A | * | 9/1996 | Grahn | G01L 1/255 73/628 |
| 5,699,161 A | * | 12/1997 | Woodworth | G01B 11/00 356/628 |
| 6,124,709 A | * | 9/2000 | Allwine | G01D 5/145 324/207.2 |
| 6,253,460 B1 | * | 7/2001 | Schmitz | G01D 5/2013 33/708 |
| 2004/0143413 A1 | * | 7/2004 | Oystol | G01C 17/38 702/94 |
| 2008/0043251 A1 | * | 2/2008 | Davidson | G01B 21/16 356/615 |
| 2008/0049211 A1 | * | 2/2008 | Ueshima | G01B 9/02049 356/4.09 |
| 2009/0140727 A1 | * | 6/2009 | Rollins | G01B 7/14 324/207.16 |
| 2010/0014101 A1 | * | 1/2010 | Davidson | G01B 21/16 73/1.79 |
| 2015/0100000 A1 | * | 4/2015 | Asaoka | G01B 11/18 600/587 |
| 2015/0345937 A1 | * | 12/2015 | Seitz | G01B 5/24 250/231.13 |
| 2016/0320169 A1 | * | 11/2016 | Becker | G01S 7/4813 |
| 2019/0323819 A1 | * | 10/2019 | Zimmer | G01D 5/145 |

OTHER PUBLICATIONS

Kaman, Sensor Data Sheet DIT-5200 Noncontact Differential Impedance Transducer, kamansensors.com.
Kaman, Users Manual DIT-5200 Non-Contact Displacement Measuring System.

* cited by examiner

*Primary Examiner* — Huy Q Phan
*Assistant Examiner* — David B Frederiksen
(74) *Attorney, Agent, or Firm* — LeonardPatel PC (57) ABSTRACT

A non-contact angular motion measuring device includes a mirror configured to move or rotate about a pivot axis. The device also includes a curved target, circularly symmetric around an axis normal to the mirror. The device further includes at least one pair of sensors configured to emit fields towards the curved target rather than the mirror.

20 Claims, 9 Drawing Sheets

NON-CONTACTING ANGULAR MOTION MEASURING DEVICE

STATEMENT OF GOVERNMENT INTEREST

This invention was made with government support under Contract No. FA8802-14-C-0001. The government has certain rights in the invention.

FIELD

The present invention pertains to measuring angular motion, and more particularly, to obtaining maximum angular measurement accuracy in a one- or two-axis rotating mechanism.

BACKGROUND

Figure 1:
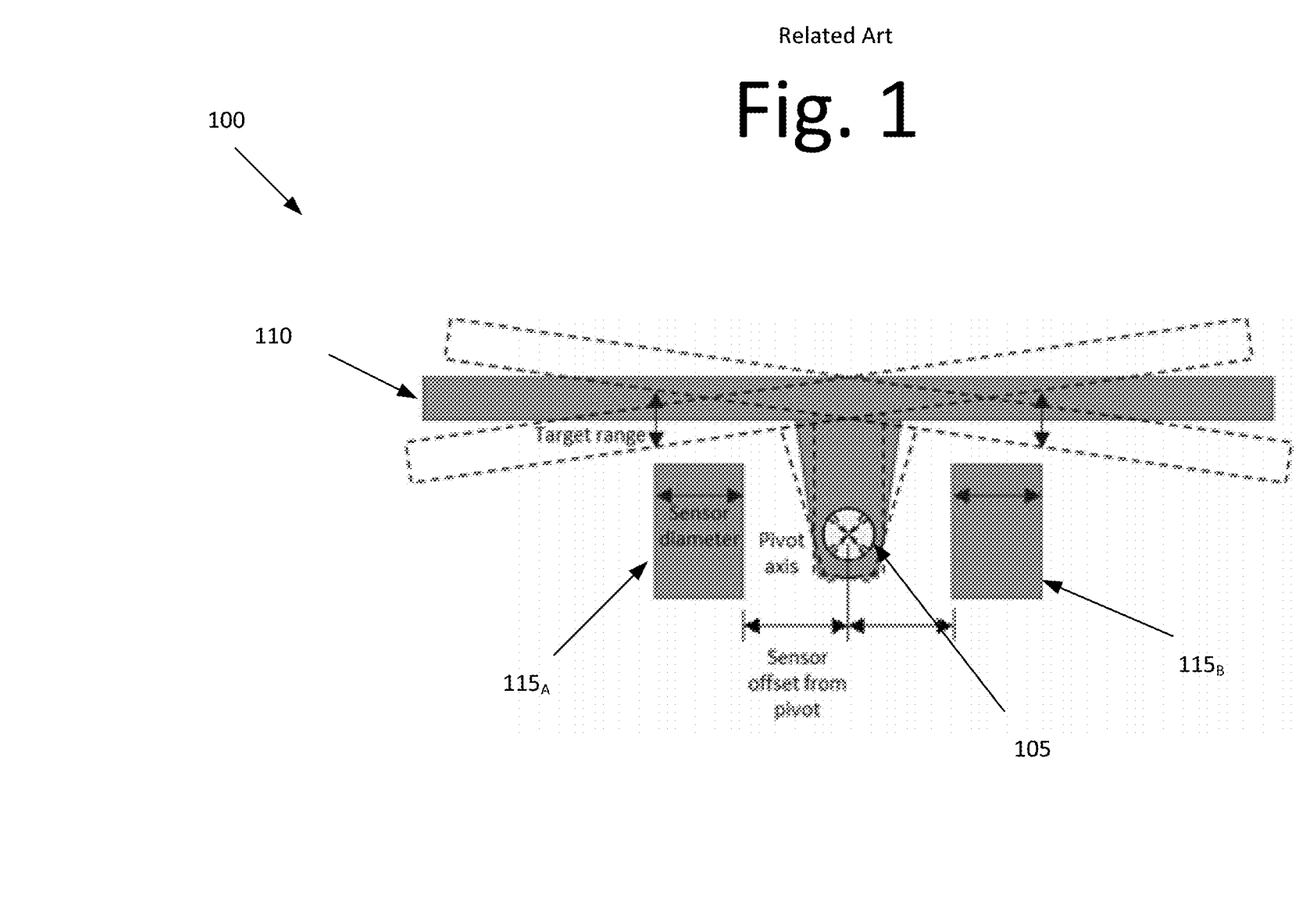
FIG. 1 illustrates a conventional angle sensing mechanism.

Proximity transducers (sometimes called "proximity sensors") are used to measure an angle in rotating devices such as optical pointing mirrors. The angular measurement is typically obtained with a pair of proximity sensors located on opposite sides of a mechanism's pivot axis. The proximity sensors are typically fixed to the frame and the target surfaces are attached to the rotating mechanism. FIG. 1, for example, illustrates a conventional angle sensing mechanism 100. In FIG. 1, a pair of proximity sensors $115_A$, $115_B$ are located on opposite sides of pivot axis 105. Pivot axis 105 allows a mirror (or target) 110 to move from an initial position to another position.

Angular readout is obtained by measuring the differential output from proximity sensors $115_A$, $115_B$ as target 110 rotates about pivot axis 105. Signal differential output is approximately double the individual signal outputs, because the gap between one end of target 110 and proximity sensor $115_A$ will decrease while the other gap between the other end of target 110 and proximity sensor $115_B$ will increase as the angle changes. This results in twice the differential signal strength between proximity sensors $115_A$, $115_B$. Electronically measuring the differential signals can be done, for example, with a Wheatstone-style bridge circuit.

The design for each proximity sensor $115_A$, $115_B$ is characterized by an effective sensing range and a resolution of measurement. Range is defined by the maximum and minimum gaps that proximity sensors $115_A$, $115_B$ can reliably sense, and resolution is the smallest gap change that can be measured reliably and unambiguously. An optimal design for angle sensing would set the sensor full measurement range to the range of motion of the target surface. This arrangement divides the measurement range into the maximum possible number of resolvable measurement increments to provide the most accurate angle measurement proximity sensors $115_A$, $115_B$ are capable of.

Figure 2:
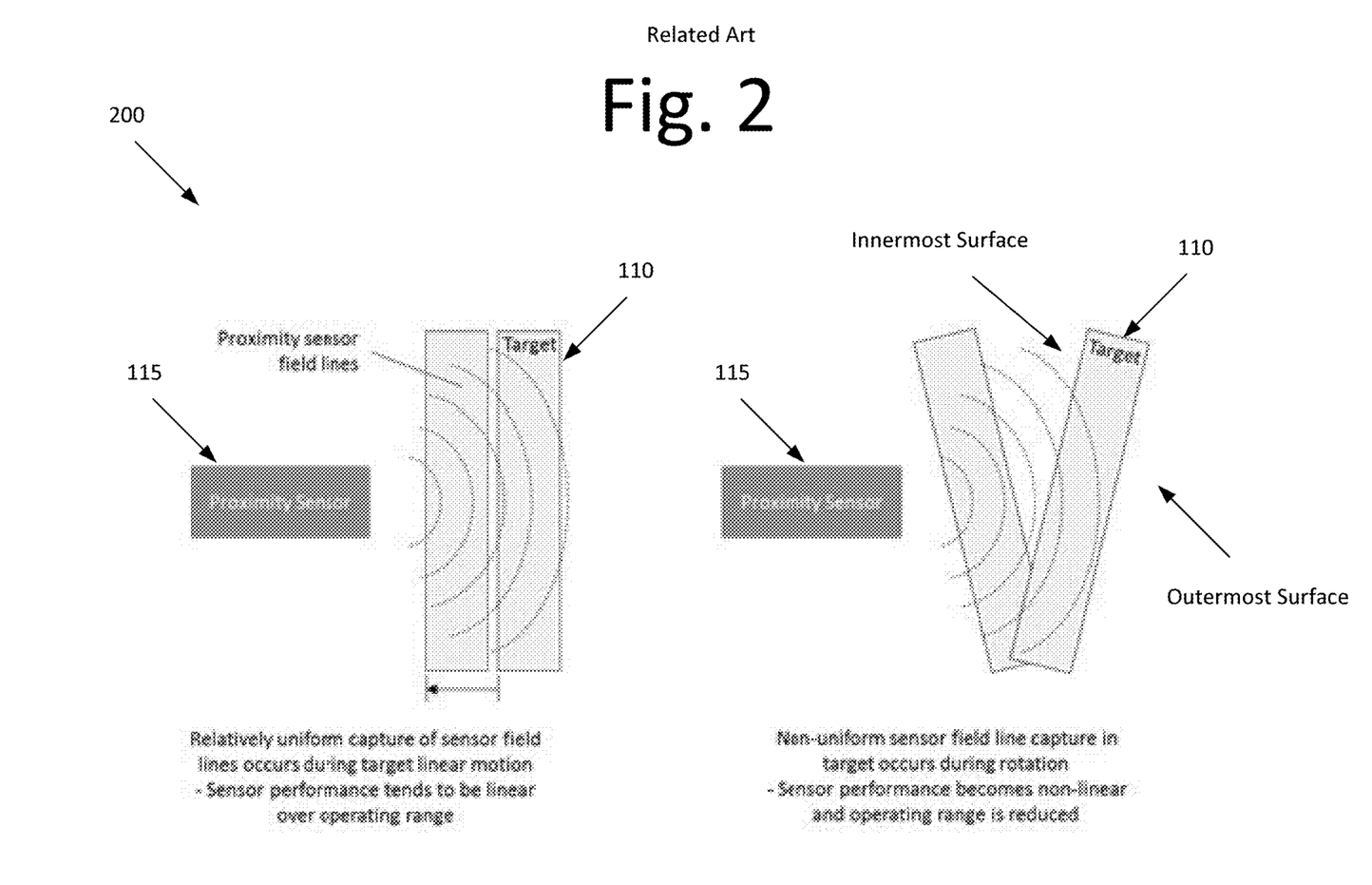
FIG. 2 illustrates a conventional angle sensing mechanism with a non-uniform sensor field line.

However, this approach has limitations. For example, the configuration shown in FIG. 1 does not allow proximity sensors $115_A$, $115_B$ to be positioned where its full range for resolution can be obtained. Another limitation is that the target surface rotates relative to the fixed sensor heads (i.e., a "tilt" between proximity sensors $115_A$, $115_B$ and target 110), and this tilt increases the sensor output nonlinearity rather than in the linear motion case where target 110 simply displaces to and from the sensor head without tilt. In FIG. 2, for example, the innermost surface of target 110 moves less than the outmost surface of target 110, when the surface of target 110 rotates as target 110 moves to and from proximity sensor 115. This results in non-uniform gap variation over the angular range of motion. This nonlinearity complicates calibration of proximity sensor 115 and degrades the nominal range to resolution capability of proximity sensor 115.

Thus, an alternative configuration may be beneficial.

SUMMARY

Certain embodiments of the present invention may provide solutions to the problems and needs in the art that have not yet been fully identified, appreciated, or solved by current angle sensing mechanisms. For example, some embodiments generally pertain to an angular motion measuring device that obtains maximum angular measurement accuracy.

In an embodiment, a non-contact angular motion measuring device includes a mirror configured to move or rotate about a pivot axis. The device also includes a curved target, circularly symmetric around an axis normal to the mirror. The device further includes at least one pair of sensors configured to emit fields towards the curved target rather than the mirror.

In another embodiment, a non-contact angular motion measuring device configured to use a target to improve range and accuracy. The device includes a mirror configured to rotate about a pivot axis. The target is offset from, and is placed behind, the pivot axis, and the placement of the target behind the pivot axis causes the target to move side to side. The device includes a first proximity sensor and a second proximity sensor facing the curved target. The first proximity sensor and the second proximity sensor are configured to emit fields towards the target rather than the mirror.

In yet another embodiment, a non-contact angular motion measuring device configured to use a target to improve range and accuracy. The device includes a mirror configured to rotate about a pivot axis. The target is offset from, and is placed behind, the pivot axis, and the placement of the target behind the pivot axis causes the target to move side to side. The device includes a first proximity sensor and a second proximity sensor facing the curved target. The first proximity sensor and the second proximity sensor are configured to emit fields towards the target rather than the mirror. The first proximity sensor and the second proximity sensor are placed on opposite sides of the target, controlling the movement of the target in relation to the first proximity sensor and the second proximity sensor.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 3:
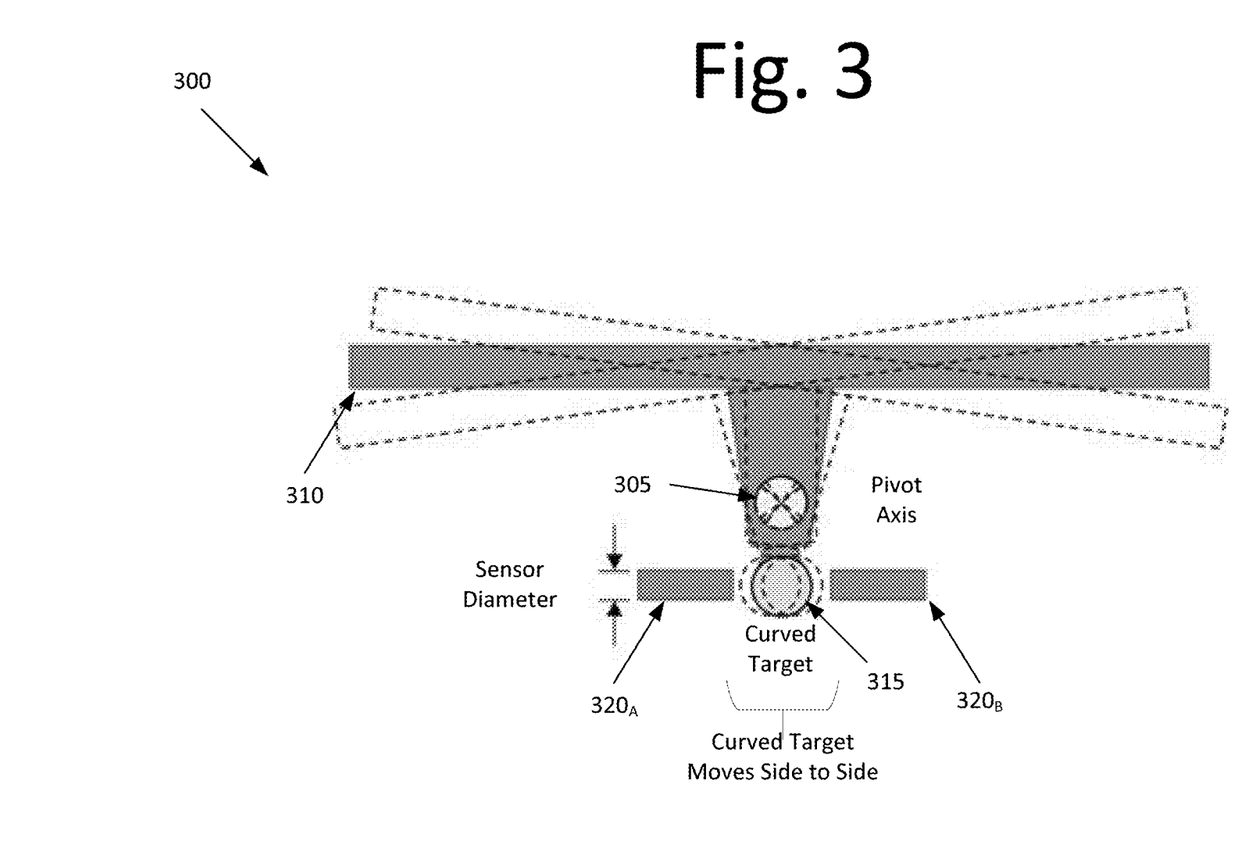
FIG. 3 is a diagram illustrating a sensing mechanism using a curved target to improve range and accuracy, according to an embodiment of the present invention.

FIG. 3 is a diagram illustrating a sensing mechanism 300 using a curved target 320 to improve range and accuracy, according to an embodiment of the present invention. In this embodiment, a mirror 310 rotates about pivot axis 305 and curved target 315 is offset from, and is placed behind, pivot axis 305. By placing target 315 behind pivot axis 305, curved target 315 may move side to side rather than forward and backwards. In some embodiments, the maximum and minimum rotation of mirror 310 is +/−12 Degrees.

In this embodiment, proximity sensors 320$_A$ and 320$_B$ face curved target 315 rather than mirror 310. Further, rather than placing proximity sensors 320$_A$ and 320$_B$ on opposites sides of pivot axis 305, proximity sensors 320$_A$ and 320$_B$ are placed on opposites sides of curved target 315, for example. This way, the movement of curved target 315 may be controlled in relation to proximity sensors 320$_A$ and 320$_B$, producing a small displacement giving the linearity.

For purposes of explanation with respect to the embodiments of the subject application, the term "proximity" may be defined as there being no direct contact in order for sensors 320$_A$ and 320$_B$ (e.g., hall effect sensors) to perform the measurements. In other words, by changing the airgap between sensors 320$_A$ and 320$_B$ and target 315, there is a change in the magnetic field, causing a change in voltage allowing sensors 320$_A$ and 320$_B$ to perform measurement.

It should also be appreciated that sensors 320$_A$ and 320$_B$ are calibrated based on a calibration sheet. So, as the airgap changes and the magnetic field is altered, there is a change in voltage in the Wheatstone bridge. This change in voltage (otherwise known as ΔV) is compared with a calibration sheet to determine the distance between sensors 320$_A$ and 320$_B$ and target 315.

Also, in this embodiment, curved target 315 may have a curved surface of any shape. Although a spherical surface is shown in FIG. 3, the embodiments are not limited to a spherical surface. Instead, any curved surface, such as conic sections (ellipsoids, parabolas, and hyperbolas), polynomials, trigonometric curvatures, etc., may be used. See FIGS. 7A and 7B, which are discussed in more detailed below.

In certain embodiments, the target surface of the curve is offset from a pivot line by a dimension that matches a curved surface movement to the full calibrated range of sensor 320$_A$ and 320$_B$. For instance, in the case of a spherical target 315, the position of the sphere center is the index to be offset from pivot axis 305. In this embodiment, the offset is used to move the target surfaces towards or away from the head of sensors 320$_A$ and 320$_B$. The change in distance form target 315 to the head of sensors 320$_A$ and 320$_B$ alters the magnetic field. This alteration in the magnetic field changes the current into the Wheatstone bridge altering the differential potential (voltage) between opposite point in the Wheatstone Bridge.

In some embodiments, the radius of a curvature is maximized based on an available design space for the purpose of minimizing the effective "tilt" of the curved surface as mechanism 300 moves over its angular range. For example, the neutral position for a proximity sensor 320$_A$ or 320$_B$ using a curved target 315 will align centerline axis of proximity sensor 320$_A$ or 320$_B$ to point through the center of curved target 315. This configuration allows the field lines from proximity sensor 320$_A$ or 320$_B$ to be equally distributed within curved target 315. As mechanism 300 rotates, the center of curved target 315 shifts slightly off the centerline of proximity sensor 320$_A$ or 320$_B$ with the result that one zone of curved target 315 will be somewhat closer to proximity sensor 320$_A$ or 320$_B$ than the opposite zone.

Figure 4:
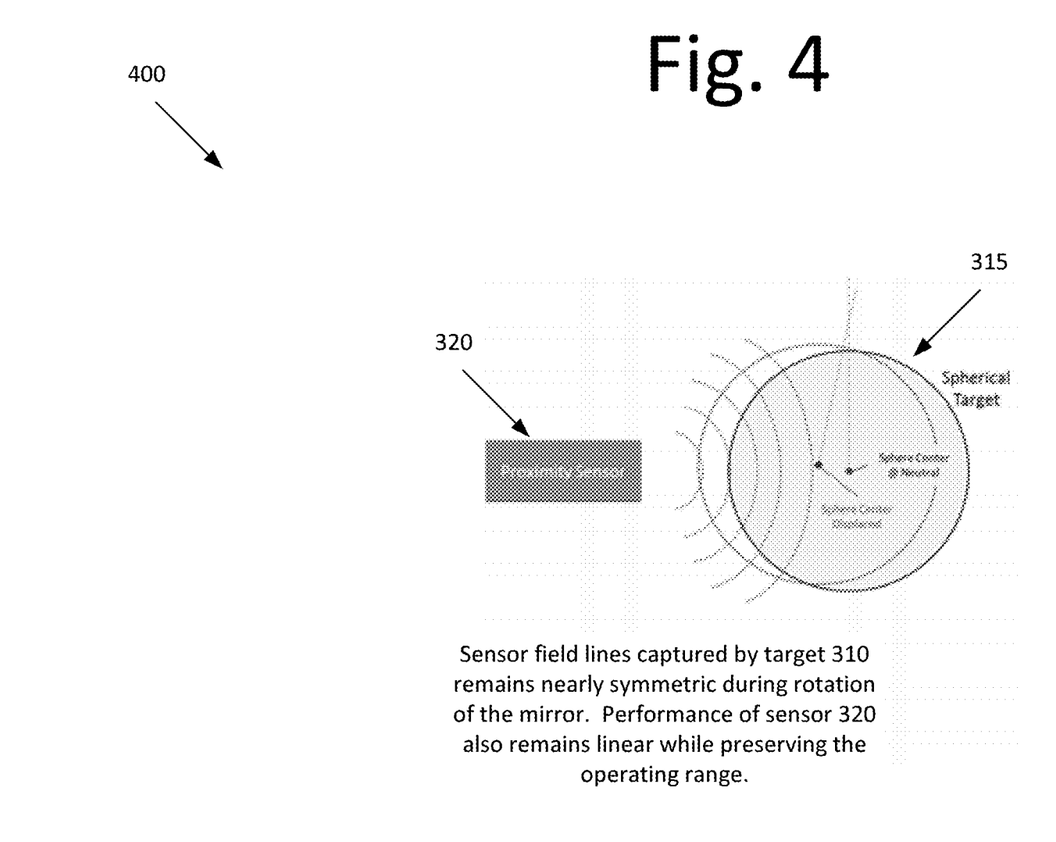
FIG. 4 is a diagram illustrating a movement of the curved target, according to an embodiment of the present invention.

FIG. 4 is a diagram illustrating a movement of a curved target 315, according to an embodiment of the present invention. Because of the curvature of curved target 315, the shift in curved target 315 toward and away from proximity sensor 320 is nominal, and the detrimental effect on the performance of proximity sensor 320 is small compared to measurement of a flat target. For example, in FIG. 4, the field lines, which emanate from proximity sensor 320, remain nearly symmetric when curved target 315 moves (i.e., when mechanism 300 shown in FIG. 3 moves about the pivot axis). In practice, the portion of curved target 315 that captures the field is the same as in a flat surface, so the range-to-resolution ratio will be close. Further, the performance of proximity sensor 320 remains linear while preserving the operating range.

In certain embodiments, the surface of curved target 315 interacts with the field lines over a smaller volume than a flat surface. This may cause the range to be slightly reduced. Further, the interaction between the field lines and curved target 315, as shown in FIG. 4, exaggerate this effect. During operation, the portion of curved target 315 that captures the field lines are nearly the same as that of the flat surface. This may cause the range-to-resolution ratio to be close.

It should also be noted that the surface of curved target 315 interacting with the emitted field has tight accuracy requirements and should be electrically conductive. As a practical matter, the surface of curved target 315 may be produced by precision single point diamond machining of an electrically conductive, machinable metal such as aluminum. For example, high quality diamond machining may achieve surface profile accuracies on the order of 0.1 microns or less. For a curved surface, there are three ranges of spatial frequency geometry variations of interest.

First are the small tooling grooves generated by the diamond tool. In this case, the emitted fields generally envelope a large number of these grooves and are individually very small. For example, the emitted fields are small enough and occur at a high spatial frequency to be averaged out by sensor 320 without materially affecting the accuracy.

At the other extreme, large scale deviations from a spherical profile (or any surface of revolution profile) that develop over the scale of the emitted field may be features that can be accommodated by calibration. In some cases, large scale variations may have a slightly ellipsoidal surface rather than a perfect sphere. These features, for example, may not be difficult to calibrate than manufacturing errors such as slightly non-planar mechanism pivot axes or small offset of the sphere center from the line of action normal to the pivot axes.

Finally, the third range of spatial frequency profile errors may be between the ranges where the profile may vary erratically as a result of machining errors and tooling limitations. The magnitude and distribution of these errors are difficult to fully calibrate out, and if so, may limit accuracy to less than theoretically possible. In general, depending on the application and design parameters, mid-range random and quasi-random spatial profile errors may start to become significant above or about 0.1 micrometers occurring over surface profile dimensions of about micro to several millimeters for typical optical applications.

In some embodiments, a curved target provides angular sensing around two axes when the pivot axis is nominally in or close to the same plane. As in the one-axis embodiment shown above, the center of the curved surface is located on an axis normal to the pivots, and in this case, aligned with the nominal intersection of the pivot axis centerlines. The sensor may provide angle measurements in a two-axis mechanism when (1) the mechanism pivot axis are in the same plane to within suitably close manufacturing tolerances, (2) the line between target center and pivot axis intersection is normal to the plane of the pivot axes to within suitable manufacturing tolerances, and (3) the line between target center and pivot axis intersection passes through the pivot axis intersection to within suitable manufacturing tolerances.

Figure 5:
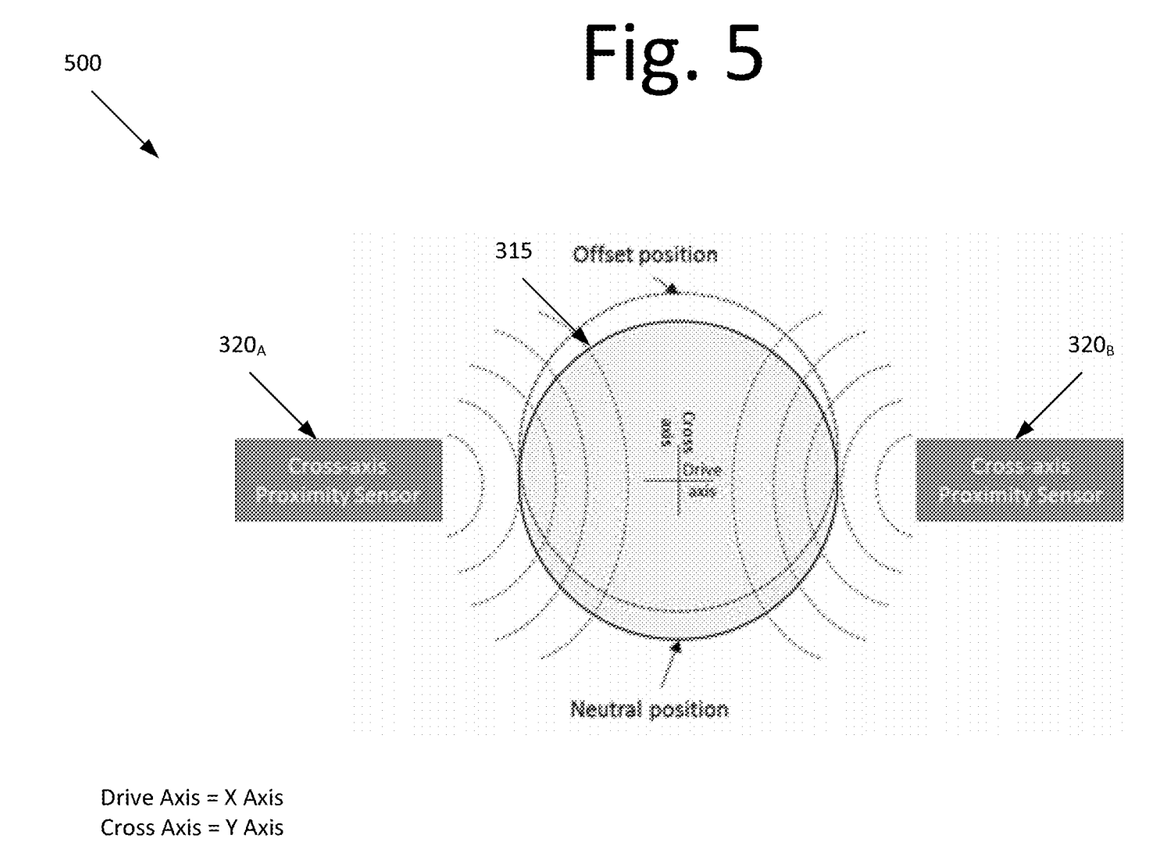
FIG. 5 is a diagram illustrating displacement of the curved target around a "drive" axis, according to an embodiment of the present invention.

FIG. 5 is a diagram illustrating displacement of a target 310 around a "drive axis, according to an embodiment of the present invention. In certain embodiments, when cross-axis position is zero, the difference in cross-axis target eddy current capture is zero, because both proximity sensors $320_A$ and $320_B$ observe the same change in target position, resulting in no change in sensor output. However, when there is also motion around the cross-axis, the sensor gain versus angle changes slightly. Thus, proper calibration requires each of the two-axis angles to be identified with both sensor outputs in order to compensate for this effect. Systems with flat targets are subject to the same phenomenon, so this is not a characteristic only of the two-axis curved target sensor, merely one that requires calibration against both axes.

Similarly, manufacturing errors will result in small differences in cross-axis sensor readings that have to be included with calibration. In both the one-axis and two-axis embodiments, proximity sensors $320_A$ and $320_B$ are fixed to base, and therefore, the proximity sensor cables do not move. This may improve reliability, and reduce cable friction and stiffness effects, on the mechanism.

Figure 6:
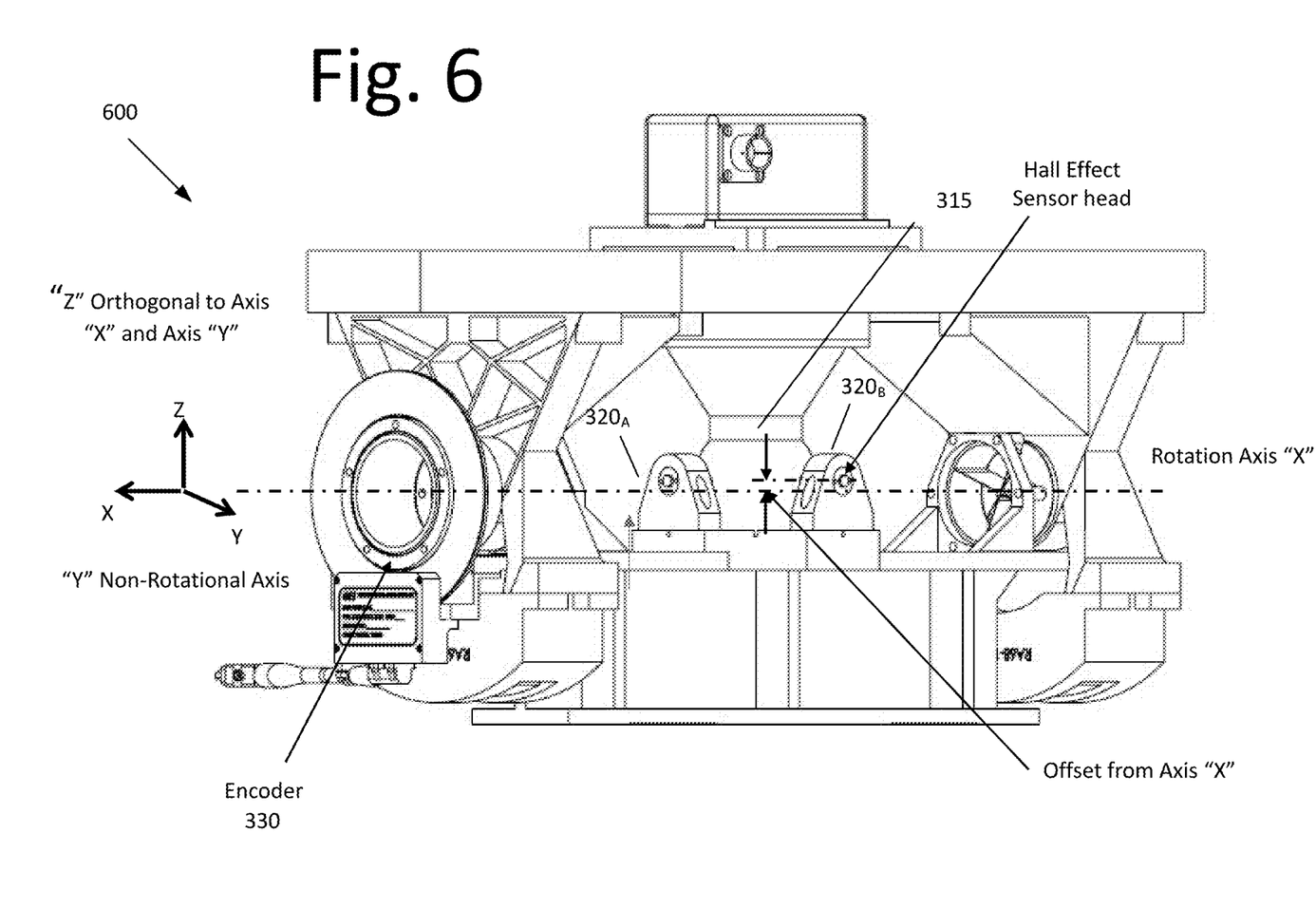
FIG. 6 is a diagram illustrating cross-section of a spherical target being offset with respect to the rotation axis "X", according to an embodiment of the present invention.
Figure 8:
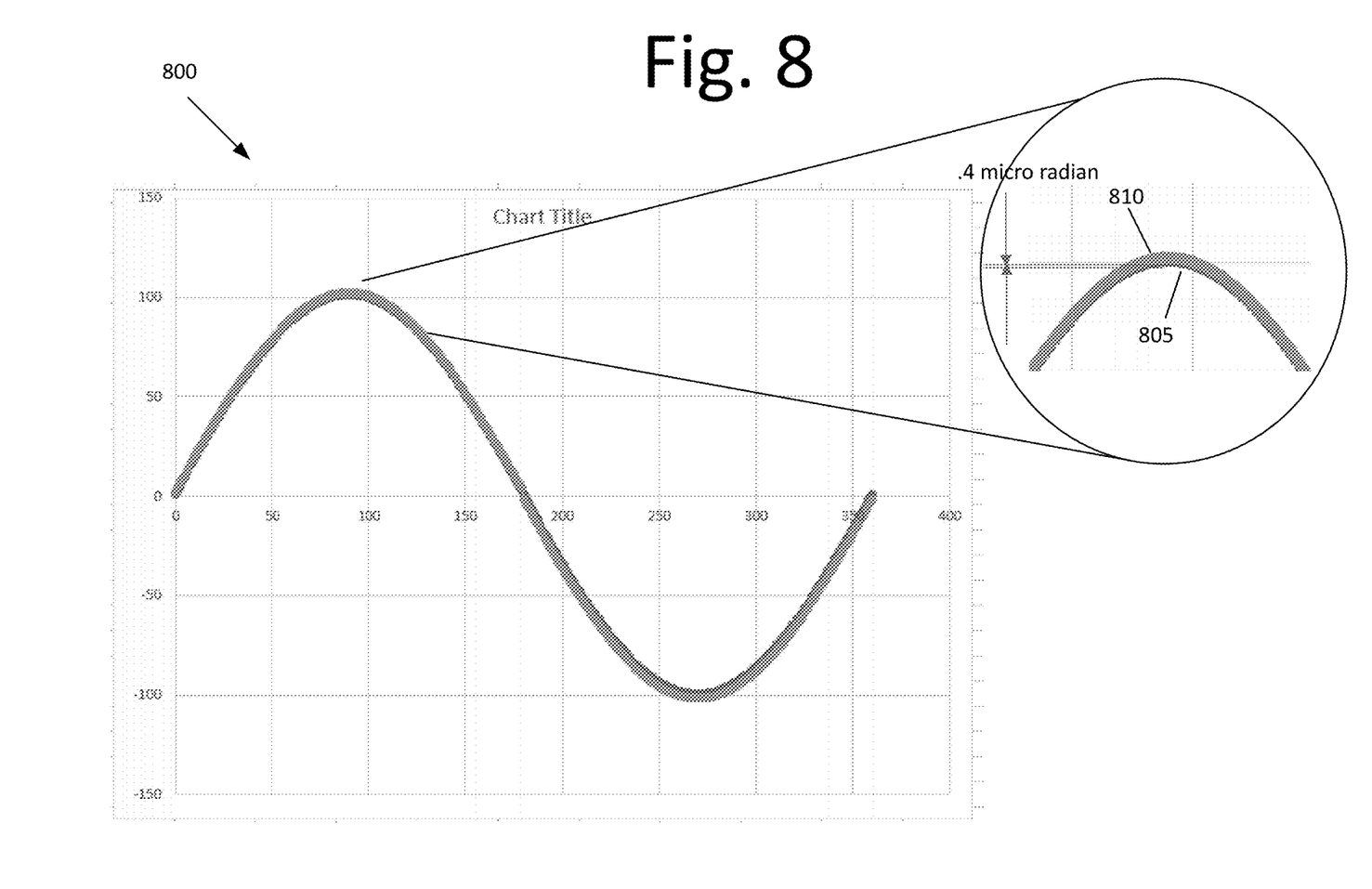
FIG. 8 is a graph illustrating results from a command for the system to perform a sinusoidal motion with an amplitude of +/−7 degrees, according to an embodiment of the present invention.

FIG. 6 is a diagram illustrating a spherical target 315 being offset with respect to the rotation axis "X", according to an embodiment of the present invention. In this diagram, an encoder 330 measures a rotational axis X. Data from this encoder is taken and compared with the data received from the sensors to show $320_A$ and $320_B$ that the embodiments are functional. See, for example, the data illustrated in FIG. 8. In FIG. 8, graph 800 shows results from a command for the system to perform a sinusoidal motion with an amplitude of +/−7 degrees, according to an embodiment of the present invention. In should be appreciated that the linearity error (in the Hall effect Sensors is proportional to the distance from sensor to target) is reduced to a minimum, permitting the correct geometry of the target to achieve high accurate measure of angular displacement for larger angles.

In graph 800, the error 805 from the optical encoder, and the error 810 from the Hall effect Sensors, are extracted. As expected, the error 805 from the optical encoder is irrelevant in its angular position. The error 810 of the Hall Effect sensors is less than 0.4 micro radian. A calibration factor due to "not-up-to date" thermal compensation Sensor Circuit is suspected, so if properly corrected, the error 810 may be reduced similar or closer to the error 805 from the encoder. This data essentially proves that the curved shape of the target minimizes the nonlinear effect encountered with a flat target.

Further investigation indicated that the 0.4 microradian discrepancy can be attributed to error due to not enough thermal compensation of the Hall Effect sensors' head electronic circuit. Current production Hall Effect sensors' head circuit have better thermal compensator that the one used for the experiment. The Hall effect Sensor used in the experiment.

The test results shown in the highlighted section proves that the Hall Effect sensors' heads tracks the encoder reading with an accuracy of 0.5 micro radian. This small discrepancy is an absolute demonstration that for 7 degrees of rotation, the nonlinearity is non existing. For common flat targets, the nonlinearity stars at approximately 5 to 7 milliradians of rotation and progresses quadratically from there and on.

Returning to FIG. 6, this embodiment was set up to verify that a specially shaped target can reduce or eliminate the nonlinearity normally experienced with flat targets. The angular reading of encoder 330, that does not experience nonlinearity, is used as a witness to compare the reading of the Hall effect sensors' heads for the rotation of the test set up.

Figure 7A:
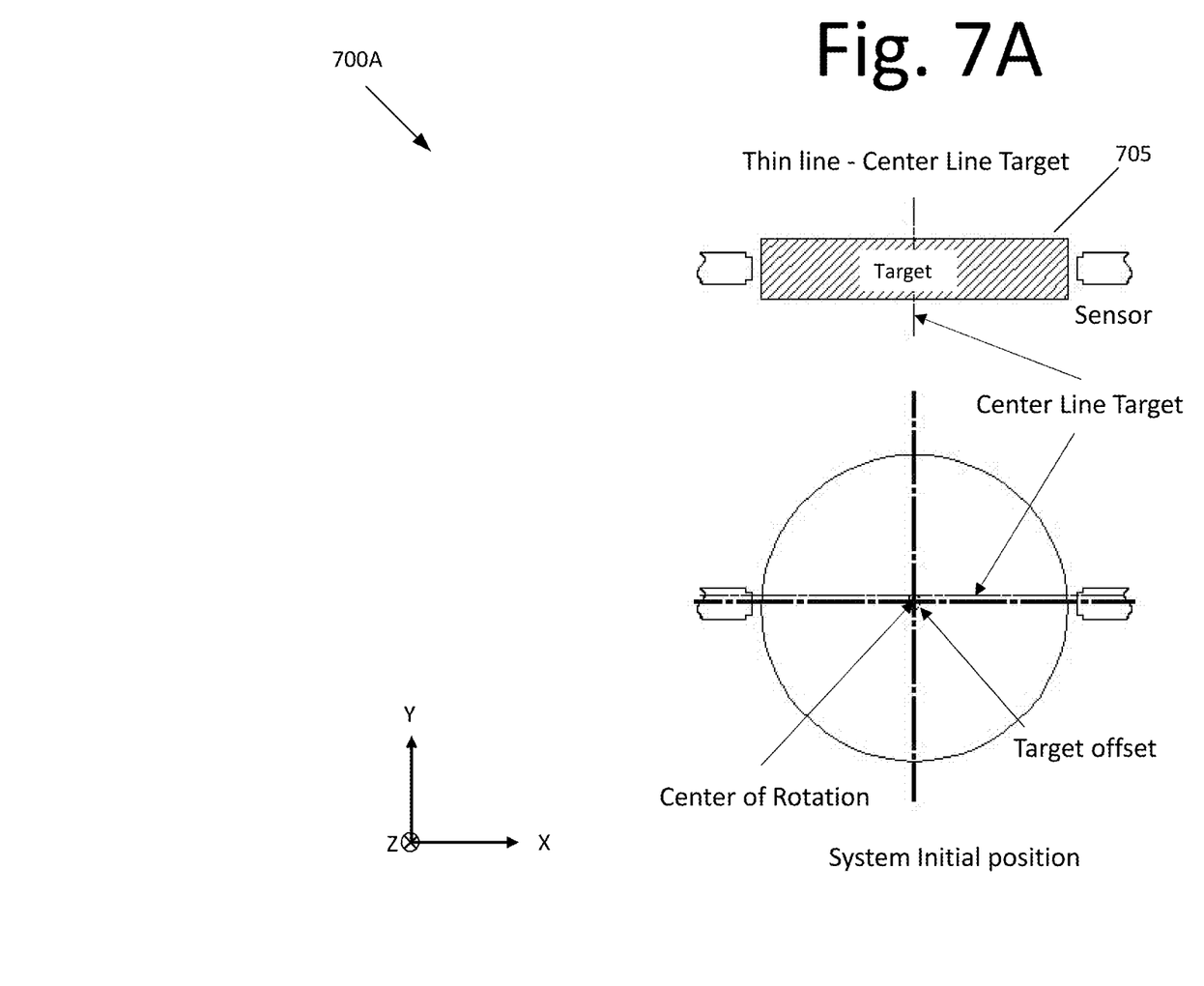
FIG. 7A is a diagram illustrating a center of target being offset with respect to the rotation axis "Z", according to an embodiment of the present invention.

FIG. 7A is a diagram illustrating a center of target 705 being offset with respect to the rotation axis "Z", according to an embodiment of the present invention. In this embodiment, center on target 705 is offset with respect to the axis of rotation "Z". As target 705 rotations around "Z" axis, target oscillates, widening and closing the gap of the opposite sensors, which are oriented in the direction of the "X" axis. Put simply, this embodiment infers that one is not limited to a spherical target only, but may apply to any target body (e.g., rectangular) that is offset with the rotation center of the axis.

Figure 7B:
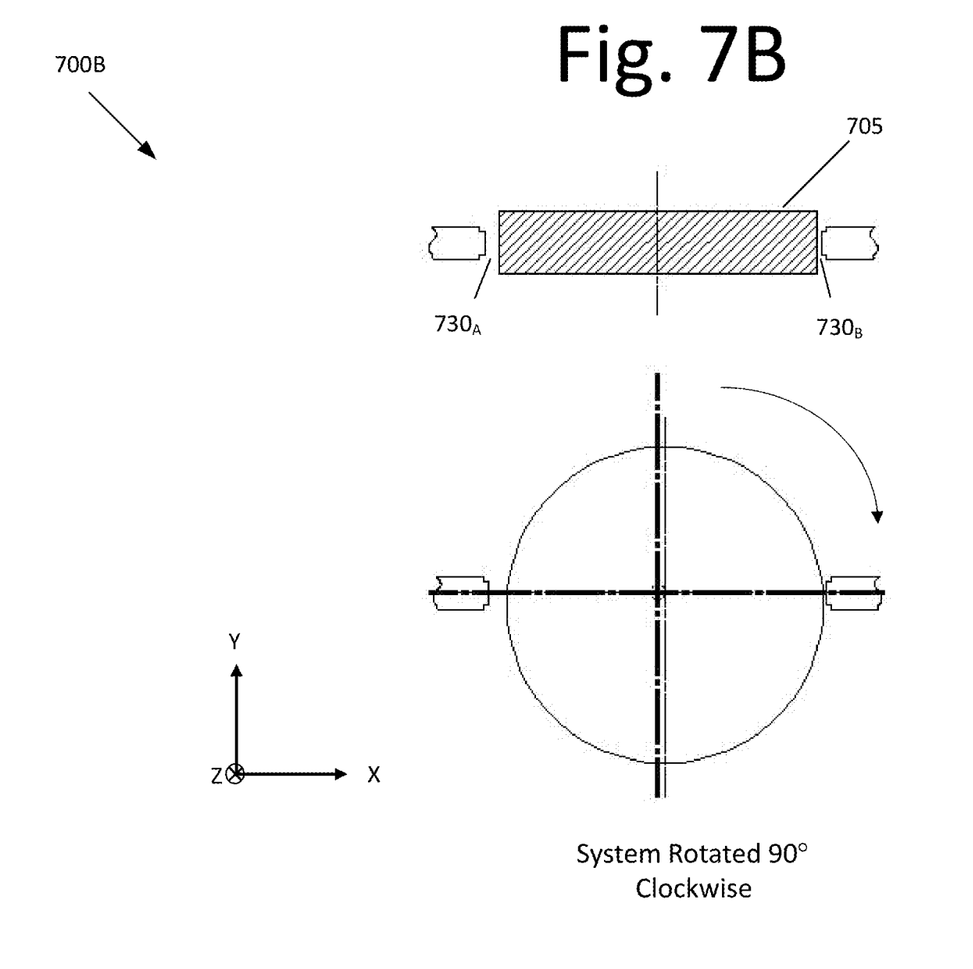
FIG. 7B is a diagram illustrating a target rotating around axis "Z", according to an embodiment of the present invention.

FIG. 7B is a diagram illustrating a target 705 rotating around axis "Z", according to an embodiment of the present invention. In this embodiment, as target 705 rotates around the "Z" axis, target oscillates, widening and closing the gap of the opposite sensors oriented in the direction of the "X" axis. Simply put, this embodiment shows that, as the geometric center of the cylinder rotates, gap $730_A$ is widened on the left side (sensor) and gap $730_B$ on the right side (sensor) decreases. It creates an imbalance of voltage, allowing for a displacement to be read.

Currently, sensors are capable of reading with acceptable accuracy rotation around one axis "Z". See, for example, FIG. 1. If a second axis of rotation is added orthogonal to the axis "X", as depicted in FIG. 1, then a second set of sensors would be required to measure rotation around the axis "X". If a compound angle is commanded, the target will be oriented (or tilted) with respect to the sensors as shown in FIG. 2. This will result in unacceptable errors. Some embodiments overcome these issues as shown in FIGS. 3-7B and as described above.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-contact angular motion measuring device, comprising:
   a mirror configured to move or rotate about a pivot axis;
   a curved target, circularly symmetric around an axis normal to the mirror; and
   at least one pair of sensors configured to emit fields towards the curved target rather than the mirror and remain fixed in position with respect to the curved target that is moving from side to side, the at least one pair of sensors and curved target being on a same plane, wherein
   a surface of the curved target facing each of the at least one pair of sensors is spherical.

2. The device of claim 1, wherein the at least one pair of sensors are placed on opposite sides of the curved target.

3. The device of claim 1, wherein the curved target is offset from a pivot line by a dimension that matches a curved surface movement to a full calibrated range of the at least one pair of sensors.

4. The device of claim 3, wherein the curved target is a spherical target, a position of a sphere center is an index to be offset from the pivot axis, wherein
   the offset moves the surface of the spherical target towards or away from the head of the at least one pair of sensors,
   a change in distance from the spherical target to the head of the at least one pair of sensors alters a magnetic field, and
   the alteration in the magnetic field changes the current in a Wheatstone bridge, thereby altering a differential potential between opposite points in the Wheatstone bridge.

5. The device of claim 1, wherein field lines of the at least one pair of sensors remain symmetric when the target rotates or moves.

6. The device of claim 1, wherein performance of the at least one pair of sensors remains linear when the mirror rotates, or the curved target moves, about the pivot axis.

7. A non-contact angular motion measuring device configured to use a target to improve range and accuracy, the device comprising:
   a mirror configured to rotate about a pivot axis, wherein the target is offset from, and is placed behind, the pivot axis, and
   the placement of the target behind the pivot axis causes the target to move side to side; and
   a first proximity sensor and a second proximity sensor facing the target, wherein
   a surface of the target facing the first proximity sensor and the second proximity sensor is spherical, and
   the first proximity sensor and the second proximity sensor are configured to emit fields towards the target rather than the mirror and remain fixed in position and remain fixed in position with respect to the target that is moving from side to side, the first proximity sensor, the second proximity sensor and the target being on a same plane.

8. The device of claim 7, wherein the first proximity sensor and the second proximity sensor are placed on opposite sides of the target, controlling the movement of the target in relation to the first proximity sensor and the second proximity sensor.

9. The device of claim 8, further comprising:
   a first airgap between the target and the first proximity sensor; and
   a second airgap between the second proximity sensor, wherein
   when the target moves between the first proximity sensor and the second proximity sensor, the first airgap between the first proximity sensor and the target and the second airgap between the second proximity sensor and the target respectively change,
   the change in the first airgap and the change in the second airgap alters the magnetic field, thereby changing a voltage in a Wheatstone bridge.

10. The device of claim 7, wherein when the target is a spherical target, a position of a sphere center is an index to be offset from the pivot axis, wherein
    the offset moves the surface of the spherical target towards or away from a head of the first proximity sensor and a head of the second proximity sensor, a change in distance from the spherical target to the head of the first proximity sensor and the head of the second proximity sensor alters a magnetic field, and the altering in the magnetic field changes the current in a Wheatstone bridge, thereby altering a differential potential between opposite points in the Wheatstone bridge.

11. The device of claim 7, wherein the mirror has a maximum and minimum rotation of +/−12 Degrees.

12. The device of claim 7, further comprising:

an encoder configured to measure a rotational axis of the mirror, wherein the measured rotational axis is compared with measurements from the first proximity sensor and the second proximity sensor to verify functioning of the device.

13. The device of claim 7, wherein the target is offset with section to a rotational axis "Z".

14. The device of claim 7, wherein the first proximity sensor and the second proximity sensor are oriented in a direction of a "X" axis.

15. The device of claim 7, wherein the target is offset with section to a rotational axis "Z", and the first proximity sensor and the second proximity sensor are oriented in a direction of a "X" axis.

16. A non-contact angular motion measuring device configured to use a target to improve range and accuracy, the device comprising:

a mirror configured to rotate about a pivot axis, wherein the target is offset from, and is placed behind, the pivot axis, a surface of the target facing a first proximity sensor and a second proximity sensor is spherical, and the placement of the target behind the pivot axis causes the target to move side to side; and the first proximity sensor and the second proximity sensor facing the target, wherein the first proximity sensor and the second proximity sensor are configured to emit fields towards the target rather than the mirror and remain fixed in position and remain fixed in position with respect to the target that is moving from side to side, the first proximity sensor, the second proximity sensor and the target being on a same plane, wherein the first proximity sensor and the second proximity sensor are placed on opposite sides of the target, controlling the movement of the target in relation to the first proximity sensor and the second proximity sensor.

17. The device of claim 16, further comprising:

a first airgap between the target and the first proximity sensor; and a second airgap between the second proximity sensor, wherein when the target moves between the first proximity sensor and the second proximity sensor, the first airgap between the first proximity sensor and the target and the second airgap between the second proximity sensor and the target respectively change, the change in the first airgap and the change in the second airgap alters the magnetic field, thereby changing a voltage in a Wheatstone bridge.

18. The device of claim 16, wherein when the target is a spherical target, a position of a sphere center is an index to be offset from the pivot axis, wherein the offset moves the surface of the spherical target towards or away from a head of the first proximity sensor and a head of the second proximity sensor, a change in distance from the spherical target to the head of the first proximity sensor and the head of the second proximity sensor alters a magnetic field, and the altering in the magnetic field changes the current in a Wheatstone bridge, thereby altering a differential potential between opposite points in the Wheatstone bridge.

19. The device of claim 16, wherein the mirror has a maximum and minimum rotation of +/−12 Degrees.

20. The device of claim 16, further comprising:

an encoder configured to measure a rotational axis of the mirror, wherein the measured rotational axis is compared with measurements from the first proximity sensor and the second proximity sensor to verify functioning of the device.

* * * * *